Jan. 8, 1924.

G. ANDERSON

TIRE CHAIN

Filed March 5, 1923

1,480,139

Inventor:
Guy Anderson
By
Attorneys.

Patented Jan. 8, 1924.

1,480,139

UNITED STATES PATENT OFFICE.

GUY ANDERSON, OF HAYNESVILLE, MAINE.

TIRE CHAIN.

Application filed March 5, 1923. Serial No. 622,818.

*To all whom it may concern:*

Be it known that I, GUY ANDERSON, a citizen of the United States, residing at Haynesville, in the county of Aroostook and State of Maine, have invented or discovered certain new and useful Improvements in Tire Chains, of which the following is a specification, reference being had therein to the accompanying drawing.

This invention relates to non-skid or driving chains for the wheels of vehicles and has for its object to provide a chain of this class which will afford greater driving traction when running over soft roadways than when running over hard surfaces or pavements, all as will hereinafter more fully appear.

Figure 1:
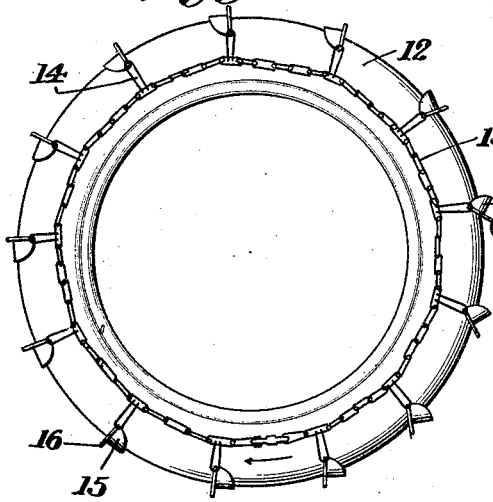
Figure 2:
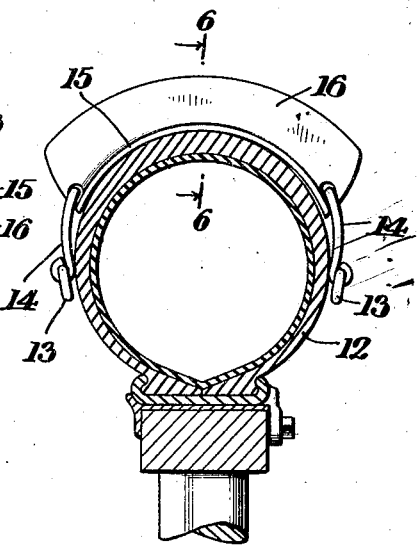
Figure 3:
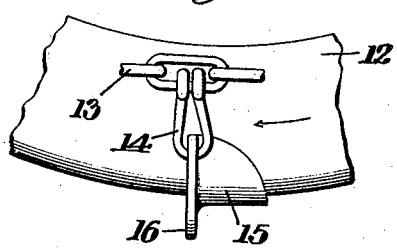
Figure 4:
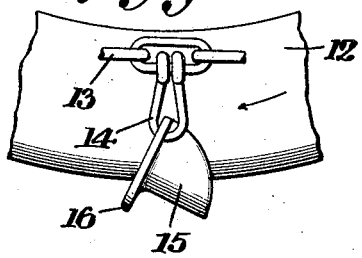
Figure 5:
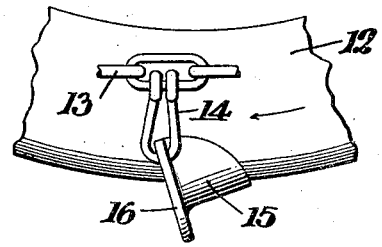
Figure 6:
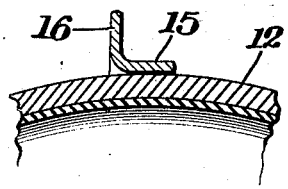

In the accompanying drawing Fig. 1 is a side view of a tire equipped with the improved chain. Fig. 2 is a section of the same showing one of the transverse traction devices in elevation. Figs. 3, 4 and 5 are fragmentary views showing a traction device in the different positions that it will assume in running on different kinds of road ways. Fig. 6 is a detail sectional view of one of the traction devices on line 6—6 of Fig. 2.

Referring to the drawing, 12 denotes a tire which may be of any improved construction, and 13 denotes one of the annular or holding side members of the non-skid or driving chain. Connected by links or hooks 14 with the annular side chains 13 are transversely curved transverse or driving members having pivotal connections with the said links or hooks and each consisting of a part 15 adapted to rest against the periphery of the tire and a radial part or flange 16, these two parts being disposed at a right angle to each other, or approximately so, the corner connection between these two parts being rounded, as shown in Fig. 6, so that these pivotally mounted transverse members will rock easily on the tire.

When a tire to which the traction or driving members are attached is running in the direction indicated by the arrows in Figs. 1, 3, 4 and 5 over a hard surface the transverse driving or traction members will naturally assume the position shown in Fig. 4; and when the wheel is running over a soft roadway or surface the traction members will naturally assume the position shown in Fig. 3 so that the flanged or radial portions of these traction members will sink or dig into such soft roadway or surface, these members rocking readily on the curved corner surfaces thereof which are adjacent to the tire. When there is considerable traction resistance on a soft roadway surface the transverse driving members may assume the position shown in Fig. 5.

From the foregoing it will be understood that the invention provides a non-skid or driving chain for vehicle wheels which is of such construction that the driving traction thereof will be greatly increased in running over soft roadways so that the vehicle wheels equipped with the improved chains will have much greater traction than when running over hard pavements or roadways. Thus a vehicle which might otherwise get stalled in snow or a soft roadway surface may be easily driven over such roadway or surface if the tires of the driving wheels thereof be equipped with the improved chains which will, of course, prevent skidding on hard smooth pavements.

Having thus described my invention I claim and desire to secure by Letters Patent:

A non-skid or driving chain for vehicle wheels comprising annular side members and a series of transverse, pivotally mounted traction members fitting against the tread of a tire and connected with the said side members, each of said traction members comprising a part adapted to rest against the tread of the tire and provided with a flange adapted to sink into a soft roadway surface, said part and flange being at right angles to each other, or approximately so, and being joined by a rounded corner part adjacent the tread of the tire.

In testimony whereof I affix my signature.

GUY ANDERSON.